United States Patent
Heinz et al.

[15] 3,693,306
[45] Sept. 26, 1972

[54] REFRIGERATOR VEHICLE FLOOR EXTRUSION

[72] Inventors: Robert G. Heinz; Harry Cohen; Edwin L. Carmel, all of Cincinnati, Ohio

[73] Assignee: Pullman Incorporated, Chicago, Ill.

[22] Filed: June 19, 1970

[21] Appl. No.: 47,855

[52] U.S. Cl. ..................52/288, 52/290, 52/533, 52/588
[51] Int. Cl. .............................................E04b 5/10
[58] Field of Search....52/533, 588, 546, 404, 60–62, 52/278, 290, 284, 287, 288, 528, 531; 296/28 M, 38

[56] References Cited

UNITED STATES PATENTS

| | | | |
|---|---|---|---|
| 2,478,993 | 8/1949 | Wing | 52/588 |
| 2,753,018 | 7/1956 | Curell | 52/630 |
| 2,786,556 | 3/1957 | Constance, Jr. | 52/588 |
| 2,869,336 | 1/1959 | Smidl et al. | 52/404 |
| 2,952,341 | 9/1960 | Weiler | 52/588 |
| 3,075,802 | 1/1963 | Lowe | 52/588 |
| 3,092,220 | 6/1963 | Black | 52/630 |
| 3,229,438 | 1/1966 | Flagan | 52/588 |
| 3,432,979 | 3/1969 | Heimann | 52/588 |

FOREIGN PATENTS OR APPLICATIONS

| | | | |
|---|---|---|---|
| 651,504 | 10/1962 | Canada | 296/28 M |
| 700,057 | 12/1964 | Canada | 296/28 M |

Primary Examiner—Frank L. Abbott
Assistant Examiner—Leslie A. Braun
Attorney—Hilmond O. Vogel and Wayne Morris Russell

[57] ABSTRACT

An extruded corner member for providing a seal between the floor of a refrigerator cargo carrying vehicle and a side wall, the member having interlocking portions for securing to the floor and to the side wall panels. The interlocking portions provide a watertight joint which can be sealed to prevent spoilable fluid from penetrating to the underside of the floor structure and contaminating insulating materials. The corner member is self-securing and does not require additional rivets, screws or other fasteners to secure it to the floor or side wall panels.

14 Claims, 3 Drawing Figures

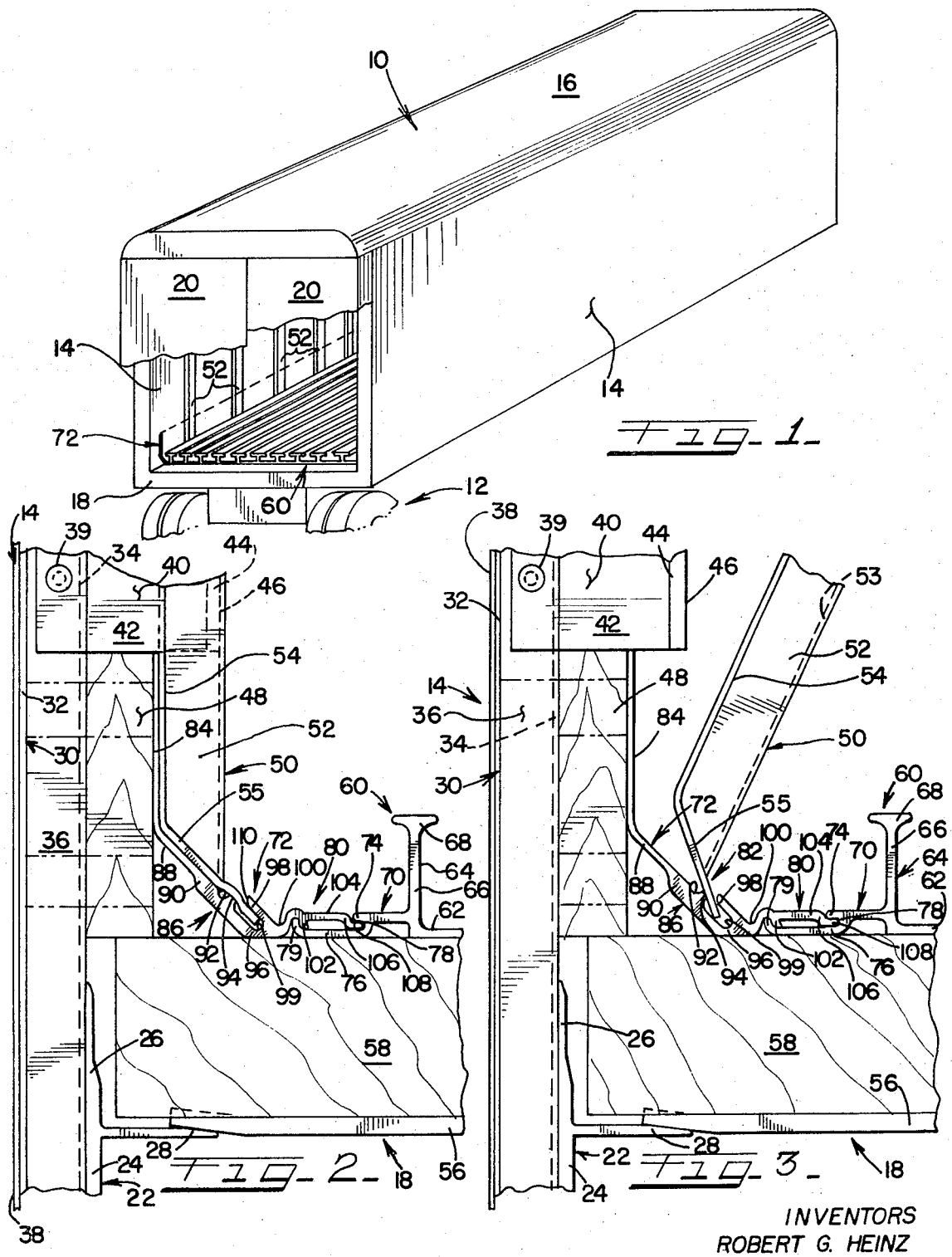

REFRIGERATOR VEHICLE FLOOR EXTRUSION

BRIEF SUMMARY OF THE INVENTION

This invention relates to extruded metal shapes used to seal the corner defined by the floor and the wall panels of a refrigerator cargo carrying vehicle, and more particularly to a substantially L-shaped corner member including locking elements for securing the member to both the side wall panels and the floor.

Heretofore the joining of the side wall panels to the floor structure has been accomplished by means of screw, bolts, or like fasteners passing through openings in overlapping portions of the vertical wall sheets and the floor unit. Watertight joints between such fasteners and the walls, even if the fasteners are screw-threaded into such openings, are difficult to obtain and this situation becomes worse with the passage of time and after the floor has been used. As a result of this, leakage of water, blood, or other fluids occurs at such joints, such fluid wetting the insulation commonly positioned beneath the floor and within the wall units thus impairing the effectiveness of such insulation and corroding the fasteners. This fluid, after passing through the insulation can contaminate parts of the truck below the floor by rusting or otherwise corroding such members.

The corner member of the present invention comprises two cooperating locking portions, one positioned in a horizontal portion and the second positioned substantially in the vertical portion of the L-shaped corner member. These locking portions are interconnected with the floor panel structure and with the side wall structure to thereby provide mechanically sound joints between the three members which is impervious to moisture or other materials which could lead through less effective sealing means.

Among the objects of the present invention is the provision of an extruded corner member effecting a sea between the floor and wall units without the use of mechanical fasteners.

A further object of the invention is to provide a novel sealing arrangement which is easy to assembly which is low in cost and effective in preventing leakage from the interior of a refrigerator vehicle.

These and other objects of the invention will become apparent from reference to the following description, attached drawings and appended claims.

BRIEF DESCRIPTION OF THE DRAWINGS

FIG. 1 is a perspective view of a refrigerator cargo carrying vehicle employing the sealing means of the present invention;

FIG. 2 is an enlarged end elevational view of the sealing means in position; and FIG. 3 is an enlarged end view of the sealing means interlocked with the floor panel structure and with the side panel or wall unit being moved into its final position.

DETAILED DESCRIPTION

Referring now to the drawings and in particular to FIG. 1, there is shown a truck 10 supported by a wheel bogie 12 and having side wall units 14, a roof unit 16, and an underframe or floor unit assembly 18. The interior of the vehicle is made accessible through the doors 20 which are pivotally attached to the end portions of the side wall units 14.

The floor unit or underframe assembly 18 includes longitudinally extending beam members 22 having vertical web portions 24, 26 and an intermediate, horizontal inwardly extending flange portion 28. Attached to and extending upward from the beam member 22 are vertically extending and longitudinally spaced Z-shaped vertical posts 30 having flanged portions 32, 34 and an intermediate web portion 36. Attached to the outer flange 32 of the vertical posts 30 is the outer metal skin 38 which extends longitudinally the entire length of the side wall units 14.

Attached at 39 to he web 36 of each Z-shaped vertical post 30 is a T-shaped spacer 40 comprising an inwardly extending body portion 42 and two opposed longitudinally extending arm portions 44 extending therefrom. The inner margin of the spacer 40 comprises a top portion 46. Thus it is noticed that the spacer is essentially a T-shaped section and manufactured of a non-metalic material having a low thermal conductivity such as fiberglass. The spacer is essentially the same height as the side wall unit 14 except for a short portion which is taken up by a spacer block 48 which is positioned at the lower end of the spacer 42. Fiberglass wall panels 50 having integrally formed corrugations 52 and an inner skin portion 54 are fixedly attached as by riveting to the arms 44 of the spacer members 42. The hollow sections of the side wall unit 14 are filled with an insulating material to increase the refrigerating efficiency of the vehicle.

The floor unit 18 includes a continuous sheet of plywood 56 extending the length and width of the vehicle and supported at its outer edges by the horizontal flanges 28 of the beams 22. Immediately above the panels 56 are positioned transversely extending and longitudinally spaced wooden spacer blocks 58. Insulation may be placed between the spacer blocks 58. On top of an supported by the spacers 58 is the floor section 60. The floor section 60 generally includes a plurality of interconnected extruded portions which each contain a bottom panel portion 62 and a number of spaced T-shaped elements 64 which include upstanding web portions 66 and top horizontally disposed flanges 68. The outer margins of the floor section 60 include a locking element portion 70 used both in interconnecting adjacent floor sections and for connecting the floor sections into the extruded corner member 72 of the present invention.

The locking element 70 of the floor section 60 includes an outwardly projecting portion 74 horizontally spaced from a base portion 76 by a slot 78. The base portion 76 terminates at its outer margin with an upstanding flange 79.

Corner member 72 extends longitudinally the length of the vehicle and effects a seal by interlocking at 80 with the locking element 70 of floor section 60. Corner member 72 also includes a section 82 which receives a flange portion 55 of the side wall panels 50 in such a manner as to securely lock the side panels in position. And finally, the corner member 72 contains a shield portion 84. Extending diagonally outward from the shield portion 84 and in a downward direction is a diagonal section 86 which includes a thinner portion 88 and a substantially thicker portion 90. The thicker portion 90 includes a radiused cutout 92 and a raised or biasing portion 94 which is raised above the diagonal plane defined by the top of the thin section 88. The diagonal portion 86 terminates at a base portion 96. Extending upward from the base portion 96 and parallel with the diagonal portion 86 is an upstanding flange 98 which forms a side of slot 99. A drain 100 is formed in the corner member to aid in removal of fluid which can accumulate along the length of the vehicle. The downwardly projecting flange 102, the horizontal flange portion 104, the downwardly inclined extension 106, and the outer flange 108 are portions of the corner member 72 which are interlocked with the floor section 60.

THE OPERATION

Referring now to FIG. 3 for a more complete understanding of the assembly and operational features of the corner extrusion, it is observed that when the extrusion is in position it forms a watertight seal between the floor section 60 and the side wall panels 50 thus preventing seepage of moisture below the floor or floor units which could contaminate insulation and render the car useless. In car structures utilizing the corner members of the present invention, floor sections 60 are assembled on the floor supporting structure and may include a series of interlocked floor panel sections or may comprise a single substantially car width floor panel unit. The floor panels terminate a specified distance from the side wall units to facilitate an interconnection with the corner member 72 of the present invention. After the floor sections have been positioned, the interlocking portion 80 of the corner member 72 is interlocked with the locking element portion 70 of the floor section 60. Referring now to FIG. 2 it will be noticed that the outer flange 108 of the interlocking portion 80 is inserted into the slot 78 formed between the portions 74 and 76. The downwardly projecting flange 102 of the corner member 72 is in contact with the upstanding flange portion 98 of the base portion 76 and forms a fulcrum of the portion of the corner member which extends from the base portion 96 to the outer flange 108 thereby forcing the outer flange 108 into a tight sealing relation with the portion 74 of the floor section 60. Thus it will be noticed that when the corner member 72 is interlocked with the floor section 60 two contact points are produced which result not only in a contact but in a sealing contact between the two members to prevent the passage of fluid therebetween. To further insure that a seal is effected a sealing compound or weldment may be placed in the groove formed by the inclined extension 106 of the corner member 72 and the projection 74 of the floor section 60.

The corner member is in position to receive the side wall units when the shield portion 84 is adjacent to the spacer block 48. It is contemplated that when the corner unit is so positioned the shield portion 84 will be angled slightly from a parallel relationship with the outer surface of the spacer block 48 and the base portion 96 may be spaced from the spacer blocks 58 to permit a deflection or a bending of the corner unit when the side wall panels are inserted and moved into their final position. This deflection or bending will produce a tight seal between contacting portions of the wall panel 50, the corner member 72 and the floor sections 60.

Referring again to FIG. 3 it is noticed that assembly of the side wall panels 50 is completed by insertion of the diagonal flange portion 55 into the slot 99 and then pivoting the panel 50 until the sheet skin 54 of the paneling is in contact with the shield portion 84 of the corner member 72. Assembly is completed when the top 46 of the fiberglass spacers 40 comes in contact with the back 53 of the corrugated portions 52. When this positioning is accomplished non-metalic fasteners or rivets, are inserted through the corrugations and into the arms 44 of the cross shaped fiberglass spacer 40. This final positioning is illustrated in FIG. 2.

Referring now to FIG. 2, it is noticed that the diagonal portions 55 which have been inserted into the slot 99 contact the raised portion 94 of the corner member 72 and the raised portion 94 acts as a fulcrum or pivot point about which the diagonal flange portion 55 is deflected after pivoting movement of the flange portion 55 has terminated. This deflection will force the lower edge or lower portion of the flange into the upstanding flange portion 98 of the corner member 72 and also force the flange portion 52 down onto the raised portion 94. Thus by having the flange portion 55 bend about the raised portion 92 when the side wall panels 50 are moved into their final position a tight seam is formed between the diagonal portion 55 and both the raised portion 94 and the underside of the upstanding flange 98. This tight fit effects a seal between the two members to prevent seepage of fluid between contacting portion of the two members. To further prevent the seepage of fluid a sealant, or caulking material, is placed in the trough which is defined by the outer margin of the upstanding flange 98 and the top edge of the diagonal flange portion 55 and designated by the numeral 110 in FIG. 2. A sealant or caulking compound is also placed in the radiused cutout 92 of the diagonal portion 86 of corner member 72 to provide a second sealed interface between the corner member 72 and the side wall panels 50.

Thus it is noticed that a watertight seal is provided between the floor unit 60 and the side wall unit 50 by use of the novel corner structure 72 of the present invention. Fluid which does collect in the area of the corner member flows into the drainage gutter 100 from which it flows to a transversely extending drain located at the end of the corner member 72 and from the vehicle. The vertical portion 84 of the corner member 72 extends in a substantially vertical direction to a height just below the bottom of the spacer member 40 and the same height as the spacer block 48. This upstanding portion 84 is intended to be a seal against seepage of moisture into insulation of the side walls in the event the vehicle should be flooded with a substantial depth of water.

The corner member provides a relatively smooth transition piece between the side wall and the floor of the vehicle thus facilitating a cross flow of air circulation transversely of the vehicle through openings which are generally spaced along the length of the T-shaped elements 64 of the floor section 60. Also, the corner member is rigidly secured between the floor section 60 and the side wall panels 50 when the assembly is completed; thus, the need for fasteners which are ordinarily used to effect the seal between floor section and wall unit has been eliminated and a maintenancefree moisture resistant seal has been provided by the use of the extruded corner member of the present invention.

The foregoing description and drawings merely explain and illustrate and invention and the invention is not limited thereto, except insofar as the appended claims are so limited, as those skilled in the art who have the disclosure before them will be able to make modifications and variations therein without departing from the scope of the invention.

What is claimed is:

1. In a refrigerator vehicle, a floor unit with a wall unit extending vertically therefrom;
    a corner member positioned at the junction of said floor unit and said wall unit,
    said corner member including a floor unit locking portion and a wall unit locking portion,
    said floor locking portion being connected with said floor unit and providing a watertight seal between said corner member and said floor unit,
    said wall locking portion connecting with said wall unit and providing a watertight seal between the corner member and the wall unit,
    said wall locking portion having a vertically extending shield portion and a diagonal, downwardly extending portion connected to the vertically extending shield portion,
    said diagonal, downwardly extending portion including a first locking part for connecting and securing said corner member to said wall unit,
    said floor locking portion including a horizontal portion extending outward from the corner member toward and connected with said diagonal portion,
    said wall unit having an outer wall portion against which the vertical shield portion rests and an inner wall panel lying against the vertical shield portion, said panel having diagonally extending flange means insertable in said wall locking portion of the corner member.

2. The invention according to claim 1, and
    a drain means to discharge fluid from the interior of said vehicle extending longitudinally of said corner member and said drain means including a bottom portion positioned at a point lower than adjacent portions of said corner member to thereby accumulate and direct the discharge of fluid.

3. The invention according to claim 1, and
    said floor unit including a bottom panel having a plurality of spaced vertically extending ribs extending therefrom,
    said ribs having longitudinally spaced openings to provide for cross flow air circulation through said ribs,
    said diagonal portion providing gradual transition portion for air flowing between the horizontal floor unit and the vertical wall units.

4. The invention according to claim 1, and
    said wall unit including insulating means,
    said shield portion extending vertically between said wall panel and said insulating means to protect the interior of the wall unit.

5. In a refrigerator vehicle, a floor unit with a wall unit extending vertically therefrom;
    a corner member positioned at the junction of said floor unit and said wall unit,
    said corner member including a floor unit locking portion and a wall unit locking portion,
    said floor locking portion being connected with said floor unit and providing a watertight seal between said corner member and said floor unit,
    said wall locking portion connecting with said wall unit and providing a watertight seal between the corner member and the wall unit,
    said floor unit including a locking part extending outward toward said wall unit and said locking part including a longitudinally extending slot portion and a base portion having an outer end projecting flange portion,
    said floor locking portion of the corner member including an end flange portion and a vertically spaced flange portion connected with said end flange portion by means of an inclined portion,
    the end flange portion being insertable in and interlocking with the slot portion,
    the vertically spaced flange portion of the floor locking portion positioned adjacent and having couple means interlocking with the end projecting flange portion of the floor unit in sealing relationship.

6. In a refrigerator vehicle, a floor unit with a wall unit extending vertically therefrom;
    a corner member positioned at the junction of said floor unit and said wall unit,
    said corner member including a floor unit locking portion and a wall unit locking portion,
    said floor locking portion being connected with said floor unit and providing a watertight seal between said corner member and said floor unit,
    said wall locking portion connecting with said wall unit and providing a watertight seal between the corner member and the wall unit,
    said wall locking portion of the corner member including a diagonal portion and an upstanding flange portion parallel to and spaced from said diagonal portion to thereby form a slot part,
    said diagonal portion including a raised biasing portion adjacent said slot part,
    said wall unit including wall panel means having diagonally extending lower flange portions,
    said lower flange portion insertable in said slot and pivotable into contact with said raised biasing portion to provide a seal between the flange portion and the slot portion.

7. In a refrigeration vehicle, a floor unit with a wall unit extending vertically therefrom;
    a corner member positioned at the junction of said floor unit and said wall unit,
    said corner member including a floor unit locking portion and a wall unit locking portion,
    said floor locking portion being connected with said floor unit and providing a watertight seal between said corner member and said floor unit,
    said wall locking portion connecting with said wall unit and providing a watertight seal between the corner member and the wall unit,
    said wall locking portion including an interlocking part defining an upwardly directed slot part and a biasing projection adjacent the slot part,
    the wall unit including a flange part insertable into said slot part and biased by the projection to provide a seal between the flange portion and the slot portion.

8. An elongated extrusion adapted to form the corner member located at the juncture of a side wall and a floor unit in a refrigerated cargo carrying vehicle, said floor unit having a plurality of cargo supporting ribs extending lengthwise thereof and separated by drainage and air-conditioning channels, the outer edge of said floor unit including a locking portion extending outward of the floor unit, said locking portion having an outwardly opening groove and below the level of said groove an outwardly extending base portion terminating at its end portion with an upwardly extending flange portion, a floor unit locking part for forming an interconnect between the corner member and the floor unit, said locking part having a horizontally extending part adapted to be inserted in the corresponding outwardly opening groove of an adjacent floor unit and having a downwardly extending flange portion engaging the upwardly extending flange portion in coupling relation during insertion of the horizontally extending part into the outwardly opening groove to securely position the horizontal part in said groove, and said side wall including an inner side panel, said corner member including locking means being coupled with said inner side panel in sealing relation therewith.

9. The invention according to claim 8, and said wall including insulating means, said corner member including a shield portion positioned between the side wall panels and the insulating means to protect both the interior of the wall unit and the insulating means.

10. The invention according to claim 8, and said supporting ribs including longitudinally spaced openings for cross flow ventilation, said corner member including a diagonal portion adjacent the floor locking pat and providing a smooth transition zone for air circulating between the floor unit and the wall unit as in cross flow ventilation.

11. An elongated extrusion adapted to form the corner member located at the juncture of a side wall and a floor unit in a refrigerated cargo carrying vehicle, said floor unit having a plurality of cargo supporting ribs extending lengthwise thereof and separated by drainage and air-conditioning channels, the outer edge of said floor unit including a locking portion extending outward of the floor unit, said locking portion having an outwardly opening groove and below the level of said groove an outwardly extending base portion terminating at its end portion with an upwardly extending flange portion, a floor unit locking part for forming an interconnect between the corner member and the floor unit, said locking part having horizontally extending part adapted to be inserted in the corresponding outwardly opening groove of an adjacent floor unit and having a downwardly extending flange portion engaging the upwardly extending flange portion in coupling relation during insertion of the horizontally extending part into the outwardly opening groove to securely position the horizontal part in said groove, and said side wall including an inner side panel, said corner member including locking means being coupled with said inner side panel in sealing relation therewith, said side wall including longitudinally spaced side wall panels with flange portions, said locking means including an upwardly directed slot part and a biasing projection adjacent the slot part, said side wall flange portions insertable into said slot part and biased by the projection to provide a seal between the flange portion and the slot portion.

12. In a refrigerator vehicle having a floor unit and a wall unit extending vertically therefrom, a corner member positioned at the junction of the floor unit and the wall unit, said corner member having a vertical portion lying against said wall unit and having a lower horizontally extending interlocking portion for coupling with said floor unit and having a diagonally extending portion connecting the vertical with the lower interlocking portion for deflecting air currents toward the floor section, an inner side wall panel engaging with the vertical portion and having a downwardly directed coupling element coupling with the inside of the corner member in sealing relation therewith, and said lower portion of the corner member having coupling means and said floor section having coupling means connecting with the coupling means of the lower interlocking portion in sealing relation therewith.

13. The invention according to claim 12, and said diagonal portion including sealing coupling means connecting with said coupling element of said inner side wall panel to provide for said sealing relation between the corner member and the side wall panel.

14. The invention according to claim 13, and said coupling element being flexible and insertable in the sealing coupling means of the diagonal portion attendant to assembly of the inner side wall panel with the corner member, the implacement of the coupling element in the corner member flexing the coupling element of the panel in tight sealing abutment with the sealing coupling means of the diagonal portion.

* * * * *